(12) United States Patent
Richman

(10) Patent No.: US 9,581,190 B2
(45) Date of Patent: Feb. 28, 2017

(54) ADJUSTABLE SUPPORT ARM

(71) Applicant: Hilel Richman, Haifa (IL)

(72) Inventor: Hilel Richman, Haifa (IL)

( * ) Notice: Subject to any disclaimer, the term of this patent is extended or adjusted under 35 U.S.C. 154(b) by 87 days.

(21) Appl. No.: 14/672,237

(22) Filed: Mar. 30, 2015

(65) Prior Publication Data

US 2016/0290387 A1    Oct. 6, 2016

(51) Int. Cl.
| | |
|---|---|
| *A47F 5/00* | (2006.01) |
| *F16C 11/10* | (2006.01) |
| *F16M 13/02* | (2006.01) |
| *F16B 2/02* | (2006.01) |
| *F16M 11/12* | (2006.01) |
| *F16M 11/14* | (2006.01) |
| *F16C 11/06* | (2006.01) |

(52) U.S. Cl.
CPC ............ *F16C 11/106* (2013.01); *F16B 2/02* (2013.01); *F16C 11/0628* (2013.01); *F16C 11/0685* (2013.01); *F16M 11/121* (2013.01); *F16M 11/14* (2013.01); *F16M 13/022* (2013.01); *F16C 11/06* (2013.01); *F16C 11/0609* (2013.01)

(58) Field of Classification Search
CPC ........ F16C 11/106; F16C 11/06; F16M 11/14; F16M 13/02
USPC ................ 248/288.51, 288.31, 181.1, 181.2; 403/56, 76, 90, 92, 122
See application file for complete search history.

(56) References Cited

U.S. PATENT DOCUMENTS

| | | |
|---|---|---|
| 870,429 A | 11/1907 | Grimler |
| 1,186,428 A | 6/1916 | Newman |
| 1,528,967 A | 3/1925 | Bersted |
| 2,510,198 A | 6/1950 | Tesmer |
| 3,096,962 A | 7/1963 | Johannes |
| 3,168,274 A | 2/1965 | Street |
| 3,584,822 A | 6/1971 | Oram |
| 3,843,272 A | 10/1974 | Jorn |
| 3,858,578 A | 1/1975 | Milo |
| 4,382,572 A | 5/1983 | Thompson |
| 4,898,490 A | 2/1990 | Herbermann et al. |
| 5,348,259 A | 9/1994 | Blanco et al. |
| 5,383,738 A * | 1/1995 | Herbermann .............. B25J 9/06 248/288.51 |
| 5,645,253 A | 7/1997 | Hoshino |
| 5,899,425 A | 5/1999 | Corey et al. |
| 5,921,694 A | 7/1999 | Herbermann |
| 6,193,652 B1 | 2/2001 | Berky et al. |
| 6,264,605 B1 | 7/2001 | Scirica et al. |
| 6,386,786 B1 | 5/2002 | Perlman et al. |

(Continued)

FOREIGN PATENT DOCUMENTS

EP    2008594    12/2008

OTHER PUBLICATIONS

International Search Report of International Application No. PCT/IL2015/051035 mailed Feb. 2, 2016.

*Primary Examiner* — Todd M Epps

(74) *Attorney, Agent, or Firm* — Pearl Cohen Zedek Latzer Baratz LLP

(57) ABSTRACT

An adjustable support arm device includes a plurality of segments. Ball-and-socket joints each connect two adjacent segments. Each joint includes a plurality of interleaved friction layers between a ball and a socket of that joint. A locking mechanism applies a normal force to the friction layers to lock the joints, the mechanism being releasable to enable bending of the joints.

20 Claims, 8 Drawing Sheets

(56) References Cited

U.S. PATENT DOCUMENTS

| | | |
|---|---|---|
| 6,561,476 B2 | 5/2003 | Carnevali |
| 6,860,668 B2 | 3/2005 | Ibrahim et al. |
| 8,172,189 B2 | 5/2012 | Wilson et al. |
| 8,252,027 B2 | 8/2012 | Helgerson et al. |
| 8,535,347 B2 | 9/2013 | Danitz |
| 2003/0083555 A1* | 5/2003 | Hunt .................... A61B 17/02 600/229 |
| 2012/0010629 A1 | 1/2012 | Mire et al. |

* cited by examiner

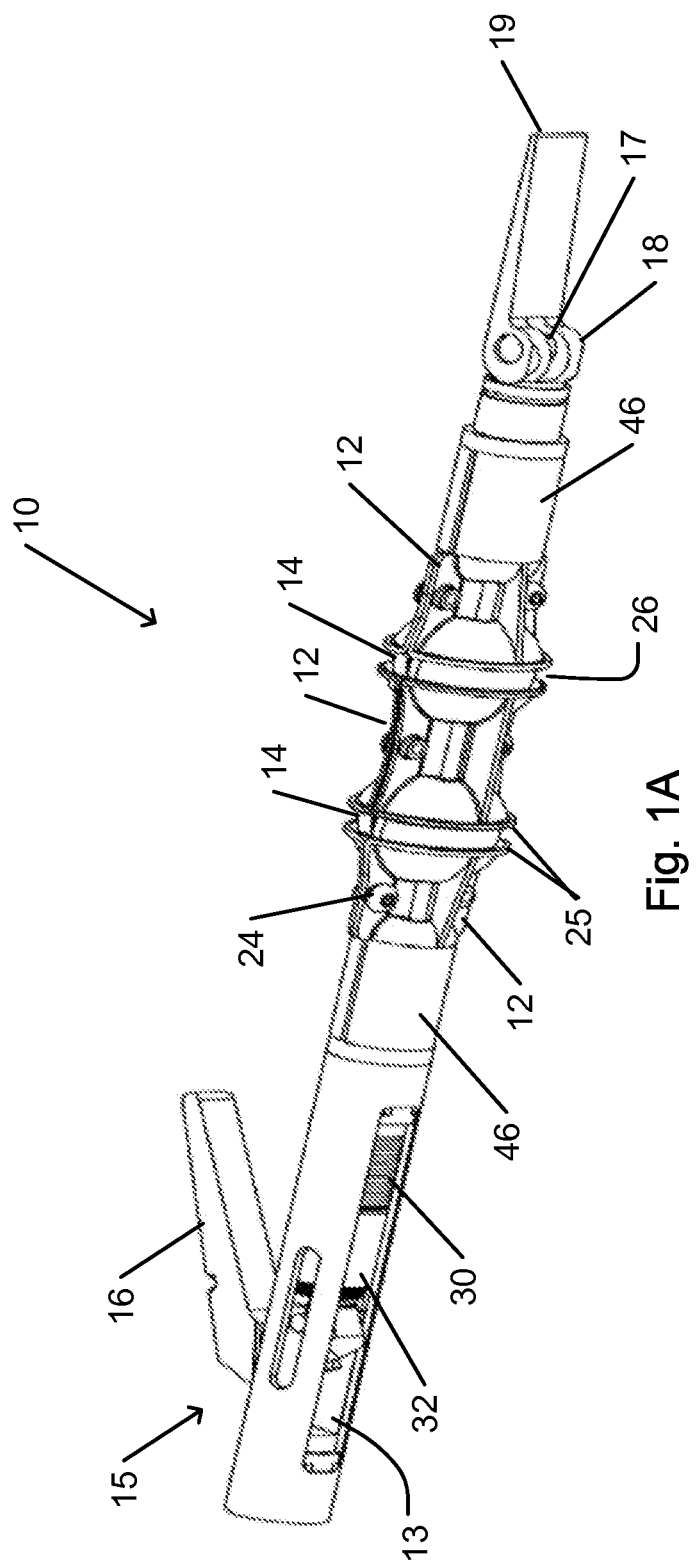

ADJUSTABLE SUPPORT ARM

FIELD OF THE INVENTION

The present invention relates to an adjustable support arm.

BACKGROUND OF THE INVENTION

Adjustable arms have been demonstrated to be of use in many situations. An adjustable arm may be useful for holding or supporting an object where space or other constraints limit (placement of a table or base). For example, surgical retractors, a laparoscope, or other operating room equipment may be held in place during surgery by an adjustable arm. Such an adjustable arm may be configured to minimally interfere with the activity of operating room personnel. A support arm may be used to hold or support objects where it is preferred that a position of the object not be limited by the nearest surface or base. Such objects may include, for example, monitors, industrial or workshop gauges or sensors, cameras, and telephones. Adjustable arms may be used to immobilize bones, limbs, or joints when bent or straightened, e.g., for orthopedic purposes.

SUMMARY OF THE INVENTION

There is thus provided, in accordance with an embodiment of the present invention, an adjustable support arm device including: a plurality of segments; one or a plurality of ball-and-socket joints, each of the one or a plurality of ball-and-socket joints connecting two adjacent segments of the plurality of segments, and including a plurality of interleaved friction layers between a ball and a socket of that joint; and a locking mechanism for applying a normal force to the friction layers to lock the one or a plurality of ball-and-socket joints, the mechanism being releasable to enable bending of the one or a plurality of ball-and-socket joints.

Furthermore, in accordance with an embodiment of the present invention, the locking mechanism includes a tension cable that is attached to segments on opposite sides of a joint of the one or a plurality of ball-and-socket joints.

Furthermore, in accordance with an embodiment of the present invention, a segment of the plurality of segments includes a channel to enable passage of the tension cable through that segment.

Furthermore, in accordance with an embodiment of the present invention, the ball of a joint of the one or a plurality of ball-and-socket joints includes a hollow space to enable passage of the tension cable through that joint.

Furthermore, in accordance with an embodiment of the present invention, the device includes a resilient element for applying tension to the cable.

Furthermore, in accordance with an embodiment of the present invention, the resilient element includes a stack of conical spring washers.

Furthermore, in accordance with an embodiment of the present invention, the device includes a tension release mechanism for releasing tension in the cable to release the locking mechanism, the tension release mechanism including a plunger operable to compress the resilient element, and to which an end of the cable is attached.

Furthermore, in accordance with an embodiment of the present invention, the plunger is rotatable to adjust a tension in the cable.

Furthermore, in accordance with an embodiment of the present invention, the device includes an element for applying a preload tension to the cable.

Furthermore, in accordance with an embodiment of the present invention, the element includes an eccentric ring, an end of the cable being attached to an axis within the eccentric ring.

Furthermore, in accordance with an embodiment of the present invention, the device includes a mechanism to adjust a distance between connection points at opposite ends of the tension cable to adjust the preload tension.

Furthermore, in accordance with an embodiment of the present invention, the ball or a friction layer of the plurality of friction layers is attached to a shaft that extends into one of the two adjacent segments.

Furthermore, in accordance with an embodiment of the present invention, the shaft has a non-circular cross section.

Furthermore, in accordance with an embodiment of the present invention, the shaft has a polygonal cross section.

Furthermore, in accordance with an embodiment of the present invention, the cross section is hexagonal.

Furthermore, in accordance with an embodiment of the present invention, two friction layers of two neighboring joints of the one or a plurality of joints are commonly attached to the shaft.

Furthermore, in accordance with an embodiment of the present invention, a shape of a friction layer of the plurality of friction layers is configured to adapt to a shape of an adjacent layer when the normal force is applied.

Furthermore, in accordance with an embodiment of the present invention, the friction layer of the plurality of friction layers includes a slot.

Furthermore, in accordance with an embodiment of the present invention, each friction layer of the plurality of friction layers includes at least two components that are assembled to form that friction layer.

Furthermore, in accordance with an embodiment of the present invention, the socket of a joint of the one or a plurality of ball-and-socket joints is incorporated within an outer envelope that is assembled over the friction layers.

BRIEF DESCRIPTION OF THE DRAWINGS

In order for the present invention, to be better understood and for its practical applications to be appreciated, the following Figures are provided and referenced hereafter. It should be noted that the Figures are given as examples only and in no way limit the scope of the invention. Like components are denoted by like reference numerals.

FIG. 1A is a schematic illustration of an adjustable support arm, in accordance with an embodiment of the present invention.

DETAILED DESCRIPTION OF THE INVENTION

Figure 1B:
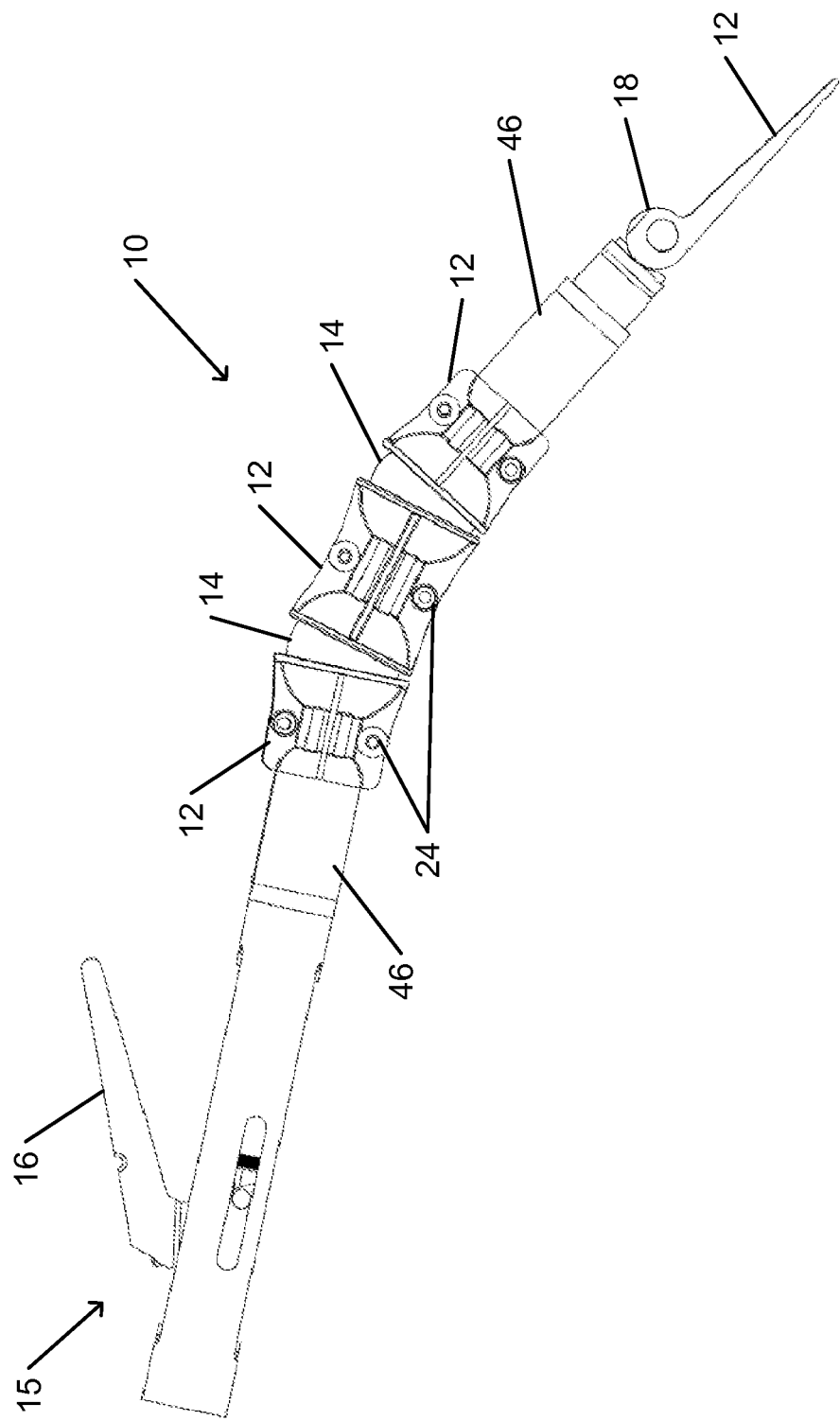
FIG. 1B schematically illustrates the adjustable support arm shown in FIG. 1A when bent.

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, use of the conjunction "or" as used herein is to be understood as inclusive (any or all of the stated options).

In accordance with an embodiment of the present invention, an adjustable support arm includes a plurality of linearly arranged segments. Two adjacent segments connect to one another at a ball-and-socket joint, where the ball (innermost layer or section) of the joint is attached to one of the connected segments, and the socket (outermost layer or section) of the joint is attached to the other segment. The ball-and-socket joint enables the adjacent segments that are connected at the joint to laterally bend relative to one another, e.g., up to a maximum bending angle. When the adjustable support arm includes a linearly arranged chain or plurality of such joints, the bending angle of the arm may be increased accordingly (e.g., to a maximum total bending angle that is approximately equal to the maximum bending angle of each of the joints multiplied by the number of joints, where the joints are substantially identical to one another).

Each ball-and-socket joint includes two or more additional (to the ball and socket layers) interleaved friction layers between the ball and the socket of the joint. The friction layers are interleaved in that each successive layer is attached to a segment that is opposite to the segment to which the previous layer was attached. For example, the two segments that are connected at the ball-and-socket joint may be designated as a first and second segment. The segment to which the ball of the ball-and-socket joint is attached, and with which the ball rotates, may be designated as the first segment. The segment to which the socket of the ball-and-socket joint is attached, and with which the socket rotates, may be designated as the second segment. In this case, the innermost friction layer is attached to the second segment and rotates with the second segment. The outermost friction layer is attached to the first segment and rotates with the first segment. Any additional friction layers of the joint alternate between being attached to the first segment and the second segment. Thus, the number of friction layers is typically even.

A locking mechanism is provided to apply a normal force to the interfaces between the friction layers and the adjacent layers (e.g., ball, socket, or other friction layer) of the joint. When the locking mechanism applies the normal force, friction that is produced at the interfaces within each joint locks that joint. When the joint is locked, lateral bending of the ball-and-socket joints may be prevented or inhibited. When the normal force is applied, the arm may be sufficiently stiff to enable the arm to maintain its shape when lateral forces are applied (e.g., up to a maximum force). For example, the lateral force may be applied by the weight of a load that is supported by the arm, or may applied as a reaction force to a force that is otherwise applied by the arm (e.g., to hold in place an object that is acted on by other forces).

The locking mechanism may be operated to reduce the normal force, and thus the friction between adjacent layers of the ball-and-socket joint. For example, the normal force may be reduced when the shape of the adjustable arm is to be modified. Deactivating the locking mechanism to reduce the friction may allow the bending angle of one or more of the joints to be modified.

The locking mechanism may operate by applying a tension force that pulls opposite ends of the adjustable support arm, or of a section of the adjustable support arm, toward one another. When the tension force is applied, adjacent layers of each joint are pulled toward one another (e.g., outer layers toward inner layers). For example, such a tension force may be applied to a joint by a cable, cord, or wire that is attached to segments or other attachment points on opposite sides of the joint. For example, the tension cable may extend from one end of the adjustable support arm, or of a section of the support arm, to the other. Tension may be applied by a preload mechanism that ordinarily applies the tension unless temporarily released. Thus, the normal configuration of the adjustable support arm is locked, unless deliberately released. In some cases, the tension cable may also provide a longitudinal force to prevent separation of adjacent components of the adjustable support arm from one another.

As another example, a tension force may be applied by a pressure or suction that is applied to a hollow channel that extends from one end to the other.

A cable tension preload mechanism may include one or more mechanical components (e.g., an eccentric ring operated by a handle or lever), by application of a force by a hydraulic, pneumatic or electro-mechanic actuator, or otherwise.

The ball, socket, and friction layers of a joint may be in the form of spherical caps or sections. For example, the socket and friction layers may be approximately hemispherical. When the joint is assembled, the ball, socket and friction layers are approximately concentric. Thus, the ball, friction layers, and socket form a series of approximately concentric partial layers in the form of spherical caps whose diameters increase with distance from the common center.

The socket may be incorporated into an outer shell that is configured to hold the inner parts (e.g., components of the segments and joints) together. For example, the outer shell may be in the form of a hollow tube whose ends flare outward to form a socket with the general shape of a spherical cap. The hollow tube may form an outermost layer of one of the segments that are connected at the joint.

In some cases, the outer shell may itself be covered by an outer cover or envelope. Such an outer cover may provide a functional or esthetic function. For example, the outer cover may prevent safety-related problems (e.g., fingers being pinched by the joints, provide electrical or thermal insulation where needed, or provide another safety-related function), maintenance problems (e.g., prevent dust or grime from entering the joints, prevent scratching or denting of components, prevent light or other radiation damage to plastic components, or provide another maintenance-related function), or serve another functional purpose.

A base of each layer (a point on the convex outer surface of each layer) is attached to a base column or shaft that extends outward from the convex side of the layer. Typically, each of the base shafts is hollow. When the joint is assembled, the base shaft of each layer extends into one of the segments that are connected at the joint. Thus, each segment includes a set of nested shafts of varying diameter, each of the nested shafts being attached to one of the layers of the joint.

For example, an innermost layer (e.g., a ball of the joint) and its base shaft may be formed (e.g., molded or machined) out of a single piece of material (e.g., plastic or metal) in the form of a tube whose end flares outward in the form of a spherical cap. An intermediate layer (e.g., a friction layer) may be similarly formed in two or more parts. For example, each of two components of the layer is in the form of a bisection of a piece that includes the base shaft and spherical cap, the bisection being along a plane that includes the longitudinal axis of the base shaft.

The base shafts may have a non-circular (e.g., oval, polygonal, or other non-circular) cross section. For example, the cross section may be hexagonal. The non-circular cross section may prevent lateral rotation about the longitudinal axis of one of the nested shafts with respect to the others.

When the joint is assembled, the base shafts of each successive layer of the joint may extend into opposite segments. Thus, when the joint is bent, the interleaved layers that are attached to opposite segments slide and rotate relative to the adjacent layers.

Assembly of outer layers (e.g., all layers other than the innermost ball of the joint) of the ball-and-socket joint may include assembling components of each layer (e.g., two half layers, or a corresponding number of smaller components) over an adjacent inner layer to form each successive layer. The outermost layer, that forms the socket of the joint, may be bolted, screwed, clipped, latched, riveted, glued, cemented, or otherwise permanently or reversibly attached to one another. Attaching the components of the outermost layer to one another may hold all of the components of the inner layers to one another. Alternatively or in addition, components of each of one or more of the inner layers may also be attached to one another.

For example, components of each layer may be molded or machined out of an appropriate plastic, metallic, or other suitable material.

A support device may include several interconnected adjustable support arms. For example, two or more adjustable support arms may be connected to, and branch off of, a single base adjustable support arm (e.g., in the form of limbs that branch off of a common trunk). For example, each branching adjustable support arm may include a separate tension cable. In such a device, one end of each cable may attach at a distal end of each branching arm. The other end of each cable may then attach to a common connection point in the base arm. Depending on the arrangement of the tension adjustment and release elements, each arm may be locked or unlocked separately, or all may be released and locked together.

An adjustable arm as described herein, in accordance with an embodiment of the present invention, may be advantageous over other types of adjustable arms. The friction layers between the ball and socket may enable an adjustable arm as described herein to maintain a configuration or position when subjected to forces and torques that may alter the shape of another type of adjustable arm. The additional strength or resistance to external forces may be achieved without increasing exterior size or dimensions, without change in material or surface preparation (e.g., no special structure or texturing), or without increasing the force that must be applied in order to lock the configuration. An adjustable arm as described herein may enable continuous (e.g., without discrete or predetermined positions) adjustment of the arm in three dimensions. Thus, the end of the arm may be placed at any point within the total range of motion of the arm FIG. 1A is a schematic illustration of an adjustable support arm, in accordance with an embodiment of the present invention. FIG. 1B schematically illustrates the adjustable support arm shown in FIG. 1A when bent.

Adjustable support arm 10 includes a linearly arranged series of arm segments 12. Components of each arm segment 12 may be held together by one or more segment assembly screws 24. Alternatively or in addition, components of an arm segment 12 may be held together by one or more clips, rivets, latches, or other structure.

Each pair of two adjacent arm segments 12 connect to one another at ball-and-socket joint 14. For the sake of simplicity, only two ball-and-socket joints 14 connecting three arm segments 12 are shown. A adjustable support arm may include more than two ball-and-socket joints 14 connecting more than three arm segments 12.

Each ball-and-socket joint 14 may enable lateral bending of adjacent arm segments 12 relative to one another. The lateral bending may be limited by the structure of ball-and-socket joint 14. For example, the lateral bending of each ball-and-socket joint 14 may be limited to a maximum bending angle of about 15°, or another maximum angle. The maximum bending angle of adjustable support arm 10 (e.g., the maximum possible angular difference between the first and last arm segments 12 of adjustable support arm 10) may be limited to the sum of the maximum bending angles of all of the ball-and-socket joints 14. In some cases, various mechanical or other effects or considerations may dictate limiting the total maximum bending angle to 90° or to another maximum total bending angle. (It should be noted that since the various ball-and-socket joints 14 of adjustable support arm 10 may be concurrently bent in different planes or directions, the total bending angle of adjustable support arm 10 may be less than a scalar sum of current bending angles of the ball-and-socket joints 14.) In the example shown in FIG. 1B, the total bending angle of adjustable support arm 10 is about 30°.

Adjustable support arm 10 includes a locking mechanism for preventing or inhibiting bending of ball-and-socket joints 14 when the locking mechanism is engaged. The locking mechanism of adjustable support arm 10 is configured to engage the locking mechanism unless the locking mechanism is temporarily released. In the example shown, the locking mechanism operates on the basis of tension in tension cable 44 (visible in FIG. 2A) that pulls arm segments 12 toward one another. The tension is created by tension element 30 of tension release mechanism 15, operating in cooperation with preload tension element 18. Tension element 30 and Preload tension element 18 may each be connected to arm segments 12 by an intervening end segment 46.

Tension element 30 may include a resilient element such as a stack of conical spring washers, a spring, or another resilient element. One end of tension cable 44 is connected to plunger assembly 32 that is configured to press against tension element 30. The other end of tension cable 44 is connected to cable attachment axis 17 within preload tension element 18. For example, an end of tension cable 44 may include male threading that may be screwed into corresponding female threading a socket on cable attachment axis 17. Alternatively or in addition, the end of tension cable 44 may be otherwise attached to cable attachment axis 17.

Preload tension element 18 may include an eccentric ring or a ring with an asymmetric outer perimeter (e.g., in the form of an annulus whose outer diameter varies from point to point around the perimeter). Cable attachment axis 17 is placed inside the eccentric ring of preload tension element 18. Preload tension element 18 may be rotated by operation of tension preload handle 19 to generate the preload tension that is applied to tension cable 44, except when released by operation of tension release mechanism 15. Alternatively or in addition, preload tension element 18 may include another element that may be operated to pull on the end of tension cable 44 that is attached to cable attachment axis 17.

Tension release handle 16 of tension release mechanism 15 may be operated to reduce the tension of tension cable 44 to enable free bending of ball-and-socket joints 14. For example, squeezing of tension release handle 16 may push plunger assembly 32 against tension element 30. Plunger assembly 32 may thus compress a resilient element (e.g., a stack of conical spring washers) of tension element 30 so as to reduce the created tension. Releasing of tension release handle 16 may remove plunger assembly 32 from tension element 30, or otherwise reduce or eliminate the compression force of plunger assembly 32 on tension element 30, thus restoring the locking tension on cable 44 by tension element 30.

A configuration of plunger assembly 32 may be adjustable to adjust the magnitude of the cable preload tension. For example, a distance between point of connection of tension cable 44 to plunger assembly 32 and cable attachment axis 17 may be adjustable. Such an adjustment may be made, e.g., when tension preload handle 19 is rotated (e.g., to the position shown in FIG. 2A) so as to release the preload tension on tension cable 44.

Figure 2A:
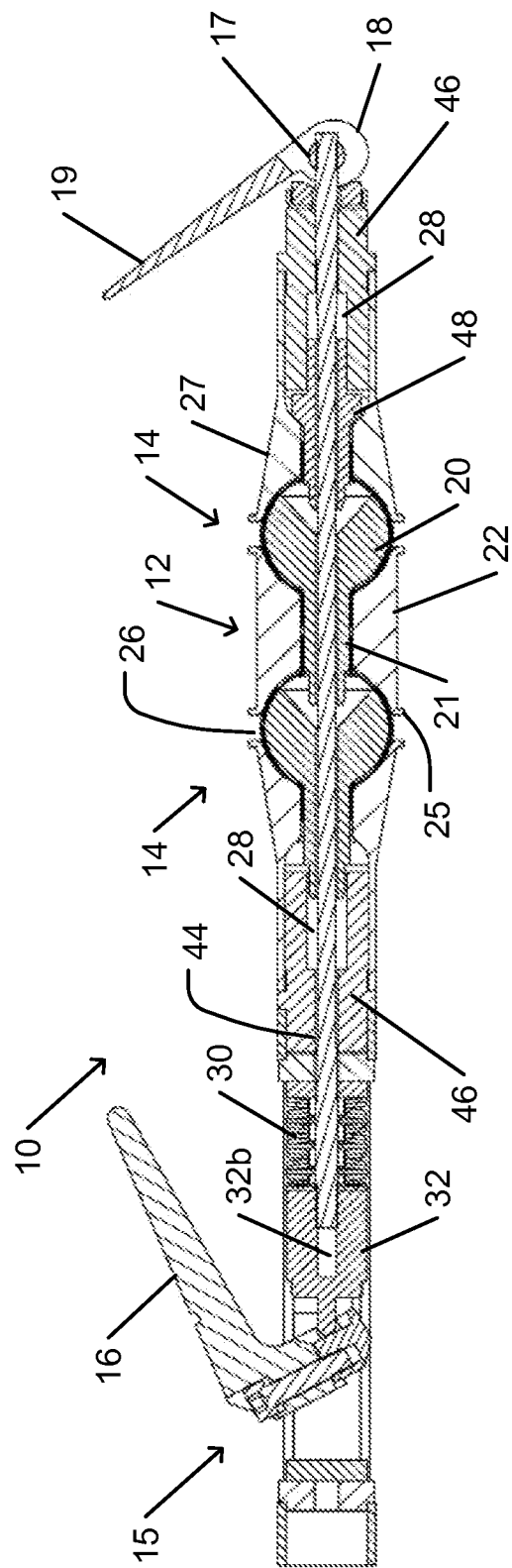
FIG. 2A shows a schematic cross section of the adjustable support arm shown in FIG. 1A.
Figure 2B:
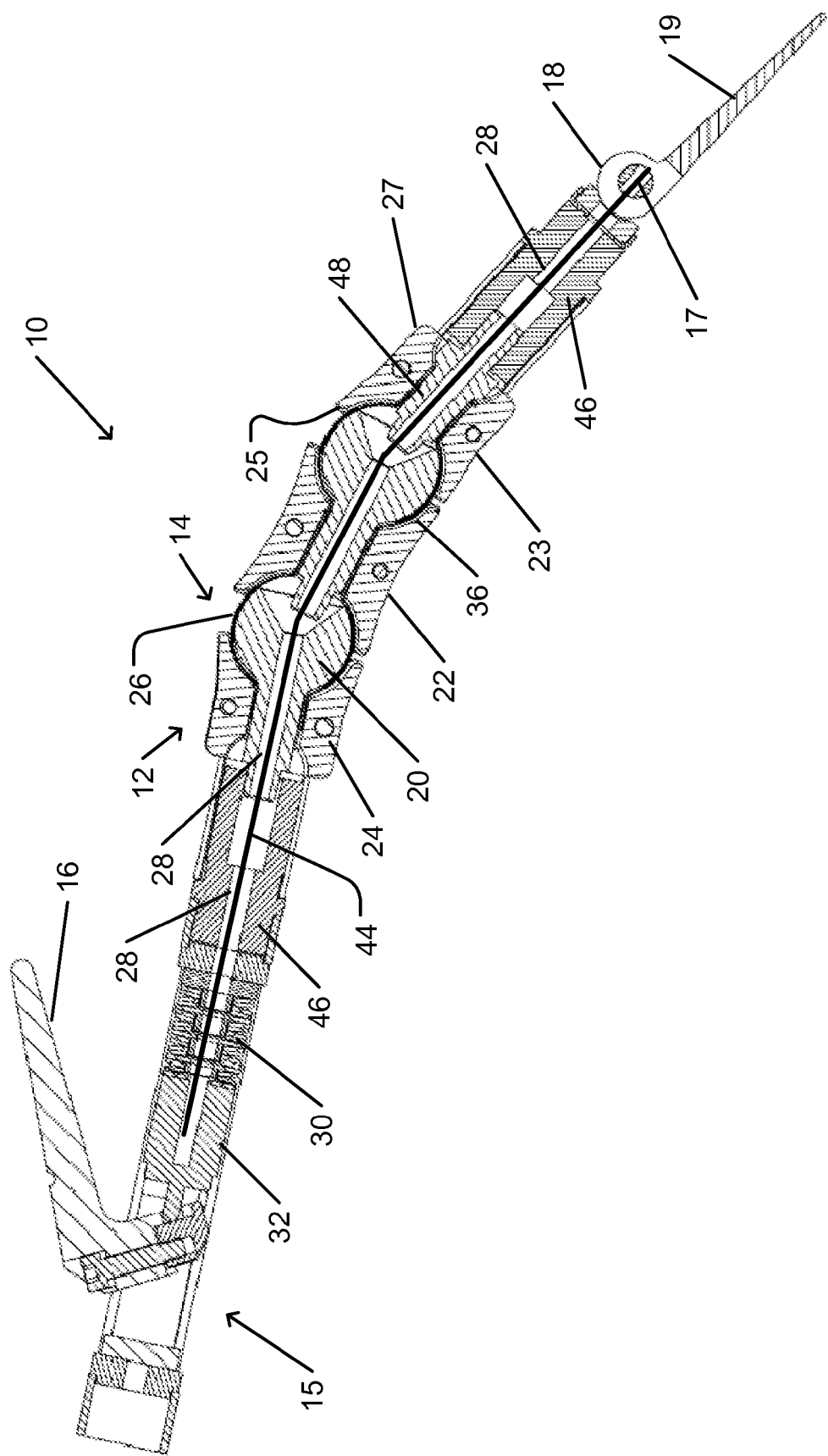
FIG. 2B shows a schematic cross section of the bent adjustable support arm shown in FIG. 1B.
Figure 3:
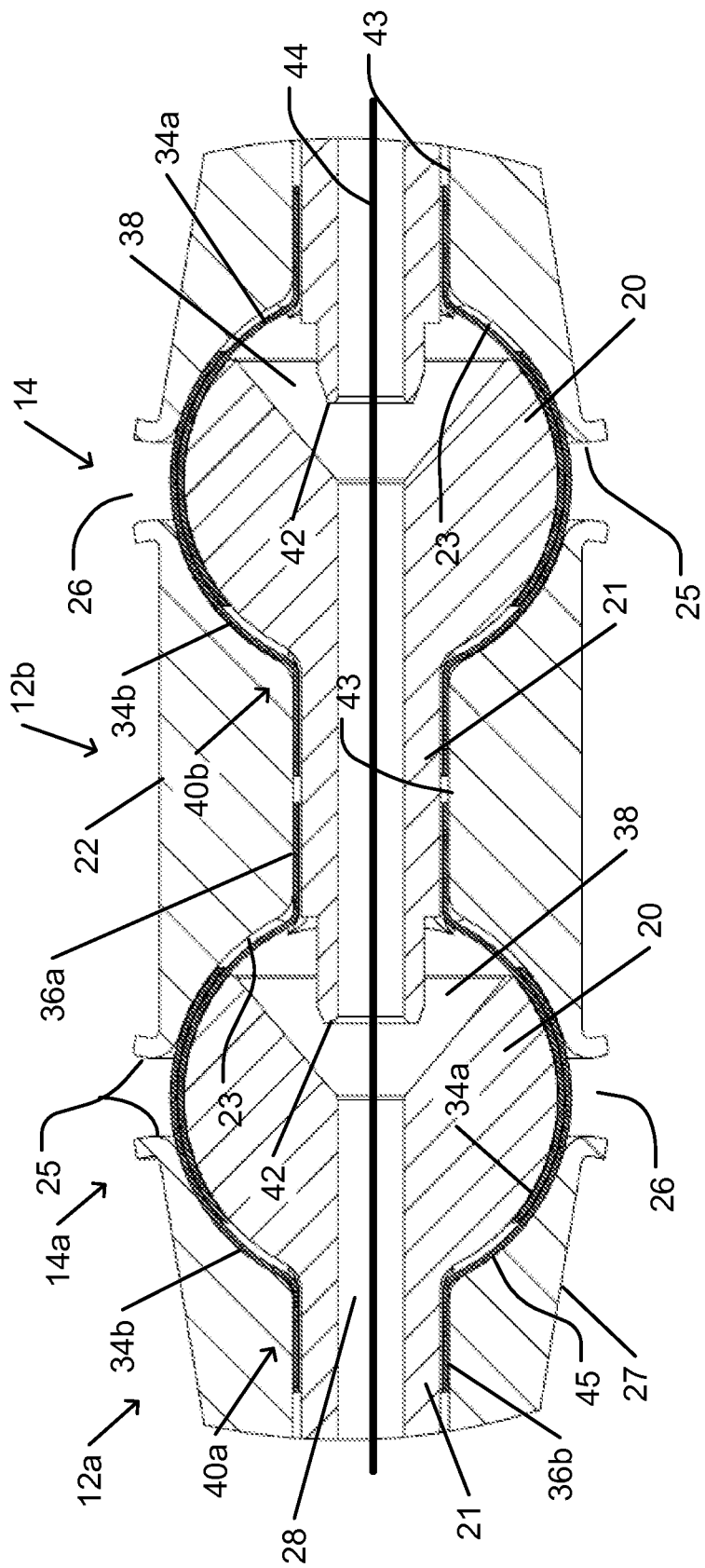
FIG. 3 shows an enlarged cross-sectional view of the joints of the arm shown in FIG. 1A.

FIG. 2A shows a schematic cross section of the adjustable support arm shown in FIG. 1A. FIG. 2B shows a schematic cross section of the bent adjustable support arm shown in FIG. 2B. FIG. 3 shows an enlarged cross-sectional view of the joints of the arm shown in FIG. 1A.

For simplicity, only two friction layers (inner friction layer 34a and outer friction layer 34b) are shown. In other cases, more than two friction layers may be included in each joint 14.

Each ball-and-socket joint 14 includes an innermost layer in the form of ball 20. Ball 20 is attached to (e.g., is integrally formed with) ball shaft 21. Ball shaft 21 forms an innermost layer of one of the arm segments 12 that are connected at ball-and-socket joint 14. The innermost layer of the other arm segment 12 may be formed by a ball shaft 21 of a ball 20 from a neighboring (e.g., separated by a single arm segment 12) ball-and-socket joint 14, or by an end connector 48. The outer perimeter of ball shaft 21 may have a hexagonal cross section, or another non-circular cross section.

Each ball shaft 21 and end segment 46 includes a central channel 28 that extends along the longitudinal axis of each ball shaft 21 and end segment 46. Tension cable 44 extends within central channel 28 from plunger assembly 32 of tension release mechanism 15 to central axis 17 within preload tension element 18. Tension in tension cable 44 may pull central axis 17 and plunger assembly 32 toward each other.

An end of ball 20 opposite the attached ball shaft 21 is hollow to form hollow space 38. Hollow space 38 is shaped and configured to enable shaft end 42 of ball shaft 21 to freely rotate when ball-and-socket joint 14 rotates within predetermined limits (e.g., as determined by a configuration of lips 25 and joint gap 26 of adjacent segment outer envelopes 22, or of a segment outer envelope 22 and an adjacent termination segment outer envelope 27).

Segment outer envelope 22 forms an outer shell of an arm segment 12 that connects two ball-and-socket joints 14. An inner surface at one end of segment outer envelope 22 includes socket surface 23 of ball-and-socket joint 14. An inner surface at the other end of segment outer envelope 22 forms ball cradle 45. An inner surface in a central portion of segment outer envelope 22 forms shaft channel surface 43. Shaft channel surface 43 may have a hexagonal cross section, or another non-circular cross section that matches that cross section of ball shaft 21.

An outer rim of socket surface 23 and ball cradle 45 terminates in lip 25. Joint gap 26 is formed by the separation between lips 25 of socket surface 23 and ball cradle 45. A bending angle of ball-and-socket joint 14 may be limited to a maximum bending angle at which lips 25 of socket surface 23 and of ball cradle 45 contact one another on one side of ball-and-socket joint 14.

Inner friction layer 34a is attached to (e.g., is formed together with) inner friction layer shaft 36a. Inner friction layer 34a partially surrounds ball 20. Inner friction layer shaft 36a extends into one of the adjacent arm segments 12 that connect at ball-and-socket joint 14. Inner friction layer shaft 36a fits between ball shaft 21 and shaft channel surface 43. When ball shaft 21 of ball 20 of ball-and-socket joint 14 extends into one of the connected arm segments 12 (that connect at ball-and-socket joint 14), inner friction layer shaft 36a extends in the opposite direction (into the other connected arm segment 12). For example, the length of inner friction layer shaft 36a may be less than or approximately equal to (e.g., no more than) half the length of shaft channel surface 43. Inner friction layer shaft 36a may have a hexagonal cross section, or other non-circular cross section that matches the cross sections of ball shaft 21 and shaft channel surface 43. The diameter and thickness of inner friction layer shaft 36a may be such as to fit between ball shaft 21 and shaft channel surface 43.

Similarly, outer friction layer 34b is attached to (e.g., is formed together with) outer friction layer shaft 36b. Outer friction layer 34b fits between inner friction layer 34a and socket surface 23. Thus, the internal diameter of outer friction layer 34b is greater than the external diameter of inner friction layer 34a. Outer friction layer shaft 36b extends into one of the adjacent arm segments 12 that connect at ball-and-socket joint 14. Outer friction layer shaft 36b fits between ball shaft 21 and shaft channel surface 43. When inner friction layer shaft 36a of ball-and-socket joint 14 extends into one of the connected arm segments 12 (that connect at ball-and-socket joint 14), outer friction layer shaft 36b extends in the opposite direction (e.g., into the same arm segment 12 that includes ball shaft 21 of that ball-and-socket joint 14). For example, the length of outer friction layer shaft 36b may be less than or approximately equal to (e.g., no more than) half the length of shaft channel surface 43. Outer friction layer shaft 36b may have a hexagonal cross section, or other non-circular cross section that matches the cross sections of ball shaft 21 and shaft channel surface 43. The diameter and thickness of outer friction layer shaft 36b may be such as to fit between ball shaft 21 and shaft channel surface 43.

The case of ball-and-socket joint 14a at the connection of first segment 12a and second segment 12b, as illustrated in FIG. 3, may be considered. Ball 20 of ball-and-socket joint 14a is attached to (via ball shaft 21), and rotates with, first segment 12a. Inner friction layer 34a of ball-and-socket joint 14a is attached to (via inner friction layer shaft 36a), and rotates with, second segment 12b. Outer friction layer 34b of ball-and-socket joint 14a is attached to (via outer friction layer shaft 36b), and rotates with, first segment 12a. Finally, socket surface 23 of ball-and-socket joint 14a is attached to (via segment outer envelope 22), and rotates with, second segment 12b.

In some cases, two friction layers of two neighboring ball-and-socket joints may share a common shaft. As used herein, neighboring ball-and-socket joints refer to two ball-and-socket joints of the adjustable support arm that are separated by a single segment. Both neighboring ball-and-socket joints connect a common segment to two other segments at opposite ends of the common segment.

Figure 4:
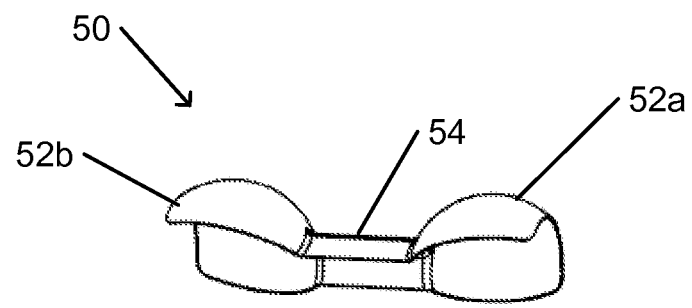
FIG. 4 schematically illustrates a friction layer of two neighboring joints of the adjustable support arm, the friction layers sharing a common connecting shaft, in accordance with an embodiment of the present invention.

FIG. 4 schematically illustrates friction layers of two neighboring joints of an adjustable support arm, the friction layers sharing a common connecting shaft, in accordance with an embodiment of the present invention.

Double friction layer piece 50 includes two friction layer halves 52a and 52b, connected by double friction layer shaft half 54. For example, double friction layer piece 50 may be produced (e.g., molded or machined) as a single piece of material, or may be assembled (e.g., glued, cemented, welded, or otherwise permanently assembled) from two or more component pieces.

Two double friction layer pieces 50 may be assembled to form two friction layers and a connecting friction layer shaft. For example, an internal diameter of friction layer half 52b may be greater than an external diameter of friction layer half 52a. Thus, when two double friction layer pieces 50 are assembled, the two friction layer halves 52a may form a friction layer similar to inner friction layer 34a (FIG. 3), and the two friction layer halves 52b may form a friction layer similar to outer friction layer 34b. The two assembled double friction layer shaft halves 54 form a single friction layer shaft that functions both as inner friction layer shaft 36a and outer friction layer shaft 36b.

In order to assemble an adjustable support arm having more than two friction layers, several pairs of double friction layer pieces 50 may be provided. For example, each set of double friction layer pieces 50 may include friction layer halves 52a and 52b of successively larger diameter.

In some cases, a friction layer may include one or more slits, slots, cutouts, creases, folds, or other structure to enable the shape of the friction layer to conform to the shape of an adjacent layer when the locking force is applied. Adaptation of the shape may increase the area of contact between the adjacent layers.

Figure 5:
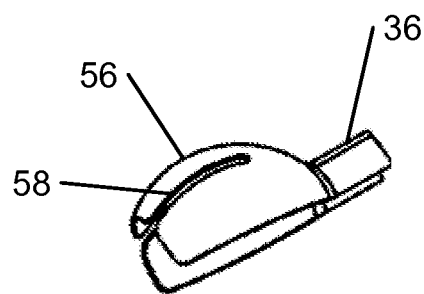
FIG. 5 schematically illustrates a slotted friction layer, in accordance with an embodiment of the present invention.

FIG. 5 schematically illustrates a slotted friction layer, in accordance with an embodiment of the present invention.

Slotted friction layer half 56 includes one or more slots 58. Slot 58 may facilitate bending of slotted friction layer half 56 when subjected to a force by a locking mechanism of the adjustable support arm. The bending may enable slotted friction layer half 56 to closely fit over an inner layer (e.g., ball or inner friction layer) when the force is applied. Closing over the inner layer may increase the friction force that is applied between the layers.

A mechanism may be provided for adjustment of the preload tension. The mechanism may include a mechanism that adjusts a distance between connection points at opposite ends of the cable. For example, a plunger of a tension release mechanism may be configured to facilitate adjustment of a preload tension that is applied to a tension cable of the adjustable support arm. For example, the plunger may be configured to enable or facilitate adjustment of a position of a connection point of the cable within the plunger.

Figure 6:
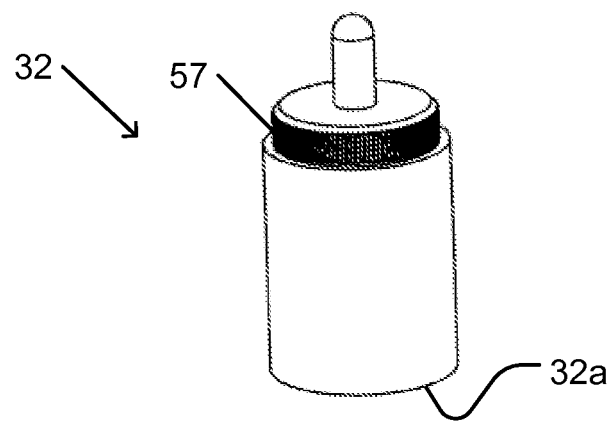
FIG. 6 schematically illustrates a plunger of a tension release mechanism configured to facilitate tension adjustment, in accordance with an embodiment of the present invention.

FIG. 6 schematically illustrates a plunger of a tension release mechanism configured to facilitate tension adjustment, in accordance with an embodiment of the present invention.

For example, plunger 32 may include a plunger bore 32b (FIG. 2A) into which an end of tension cable 44 is inserted and held. Plunger 32, plunger bore 32b, or both may be provided with structure that enables connection to, or holding of, an end of cable 44. The structure may enable changing a length of tension cable 44 that is inserted into plunger bore 32b.

For example, plunger bore 32b may be provided with internal threading. An end of tension cable 44 for insertion into plunger bore 32b may be provided with corresponding threading. Thus, rotation of plunger 32 may adjust a distance that the end of tension cable 44 is inserted into plunger bore 32b, thus changing the distance between the connection points at opposite ends of tension cable 44. Plunger 32 may be provided with a grasping ring 57 to facilitate rotation of plunger 32. For example, grasping ring 57 may be knurled or otherwise textured, or may be coated or covered with a high friction material (e.g., rubber or a similar material). Grasping ring 57 may be accessible to fingers or a tool via openings 13 (FIG. 1A) in tension release mechanism 15.

Contact end 32a of plunger 32 is configured to rest against, and apply a force to, tension element 30. Thus, adjustment of a length that of tension cable 44 that is inserted into plunger bore 32b may affect the compression of tension element 30, and thus the tension in tension cable 44.

An adjustable support arm in accordance with an embodiment of the present invention may be assembled from a set of components.

Figure 7:
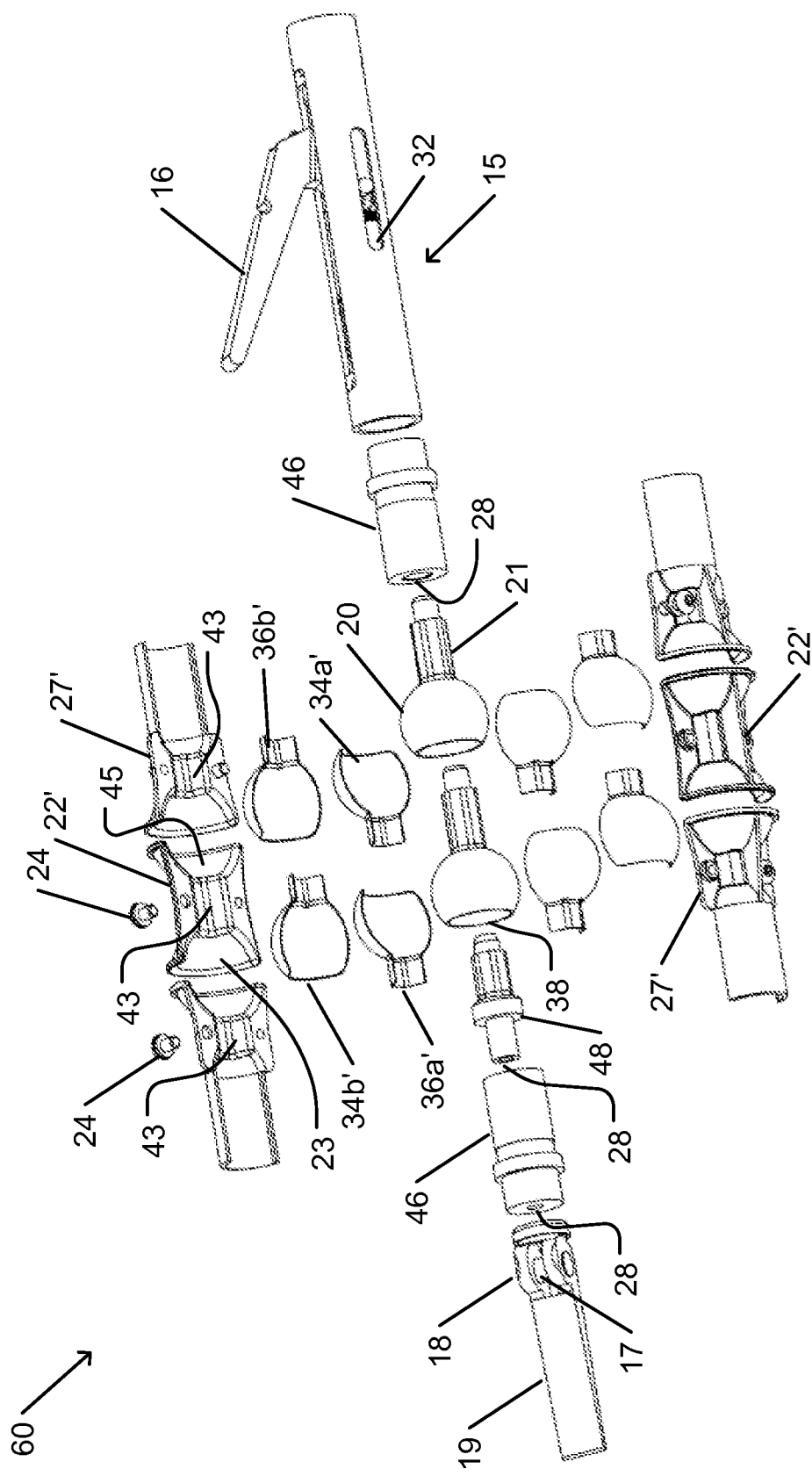
FIG. 7 is an exploded schematic illustration of components for assembly into the adjustable support arm shown in FIG. 1A, in accordance with an embodiment of the present invention.
Figure 8:
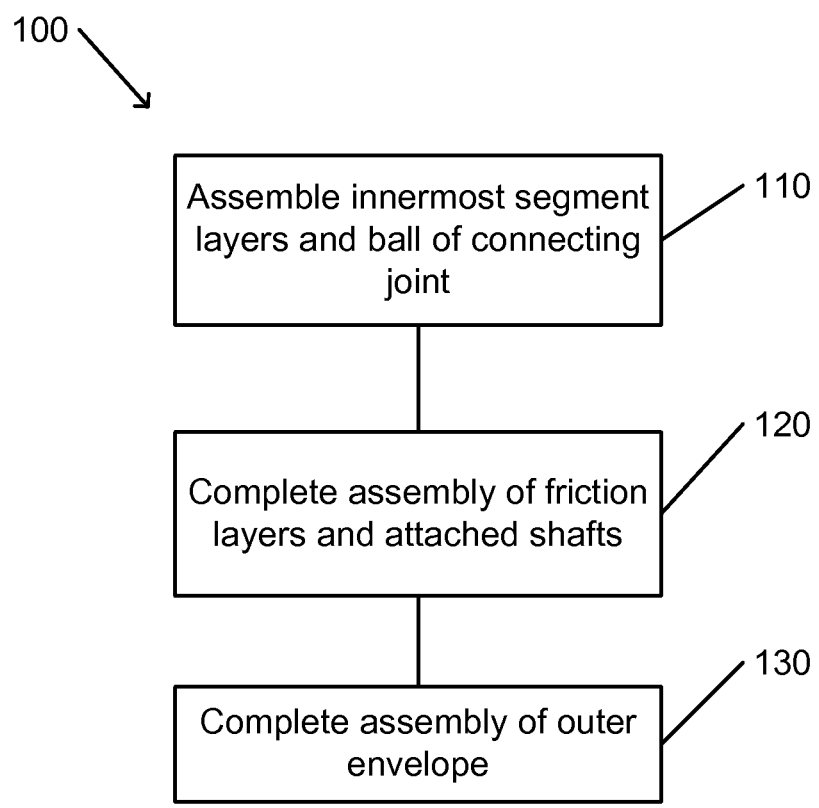
FIG. 8 is a flowchart depicting a method for assembly of components into the adjustable support arm, in accordance with an embodiment of the present invention.

FIG. 7 is an exploded schematic illustration of components for assembly into the adjustable support arm shown in FIG. 1A, in accordance with an embodiment of the present invention. FIG. 8 is a flowchart depicting a method for assembly of components into an adjustable support arm, in accordance with an embodiment of the present invention.

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Adjustable support arm assembly method 100 may be performed on a set of arm components 60. For simplicity, arm components 60 are shown for assembly of an adjustable support arm with three segments and two ball-and-socket joints. Arm components 60 are shown for assembly of ball-and-socket joints where each joint includes two friction layers. Arm components 60 are shown for assembly of an adjustable support arm whose locking mechanism is based on tension that is applied by mechanical components to a tension cable. When the adjustable support arm to be assembled includes a different number of joints, segments, or friction layers, the number and type of provided components may differ from those shown. When the tension of the locking mechanism (e.g., based on suction, hydraulic pressure, or another mechanism or actuator), the provided components may differ from those shown in a manner that is appropriate to the other locking mechanism. In any of these cases, operations for assembly of the adjustable support arm may differ from those discussed with regard to adjustable support arm assembly method 100.

In some cases, components that are provided for assembly of an adjustable support arm may differ from the components shown as arm components 60. For example, two or more of arm components 60 may be provided in the form of a single component. The single component may incorporate, include, or provide the functionality of, two or more of arm components 60. As another example, a single component of arm components 60 may be provided as two or more separate components that are to be assembled to produce that single component (e.g., tension release mechanism 15, or another component).

Innermost layers of segments of the adjustable support arm (e.g., ball shafts 21, end connector 48) and the connecting joint may be assembled (block 110). For example, each ball shaft 21 or end connector 48 may be placed within hollow space 38 of an adjacent ball 20.

Typically, prior to assembling the innermost layers, halves of outer layers may be arranged. For example, termination segment outer envelope components 27' and segment outer envelope component 22' may be arranged on a work surface with their concave sides facing upward. Outer friction layer components 34b' and outer friction layer shaft components 36b' may be placed within termination segment outer envelope components 27' and segment outer envelope component 22'. Inner friction layer components 34a' and inner friction layer shaft components 36a' may be placed within outer friction layer components 34b' and outer friction layer shaft components 36b' (with each inner friction layer shaft component 36a' extending outward in a direction opposite to that of outer friction layer shaft component 36b'). Ball shafts 21, end connector 48, balls 20, and other components may be assembled (again, with each ball shaft 21 extending in a direction opposite that of that of inner friction layer shaft component 36a') within inner friction layer components 34a' and inner friction layer shaft components 36a'.

In some cases, assembling balls 20 and ball shafts 21 may include threading a tension cable 44 (FIG. 2A) through central channels 28 of intervening structures between two end attachment points. For example, a first attachment point may be within plunger assembly 32 of tension release mechanism 15 (e.g., with tension release mechanism 15 partially or fully disassembled). The free end of tension cable 44 may be threaded through other components of tension release mechanism 15, such as tension element 30 (e.g., a stack of conical ring washers). The free end of tension cable 44 may be threaded through central channel 28 of end segments 46, ball shafts 21, balls 20 (e.g., through hollow space 38), and end connector 48. The free end may be attached to cable attachment axis 17 within preload tension element 18. Alternatively, the attachment and threading of tension cable 44 may be in the reverse order (first attaching to cable attachment axis 17, threading the free end through central channel 28, and attaching the free end to plunger assembly 32), in another order (e.g., threaded through all or part of central channel 28 prior to attachment of the ends to the end points), or in another manner (e.g., attaching the end points to different components).

Alternatively or in addition, tension cable 44 may be threaded through central channel 28 and attached to end points after further operations in the assembly of the adjustable support arm.

If operation of the locking mechanism is not based on tension, appropriate other assembly may be performed (e.g., placement of sealing structure or insertion of adjustable chamber).

Assembly of the friction layers may be completed over balls 20 and inner layers of the segment (block 120).

For example, the remainder of inner friction layer components 34a' and inner friction layer shaft components 36a' (e.g., a half with the concave side facing downward) may be assembled over balls 20 (and previously placed upward-facing inner friction layer components 34a' and inner friction layer shaft components 36a'). In placing inner friction layer components 34a' over a ball 20, inner friction layer component 34a' is oriented such that inner friction layer shaft component 36a' may extend in a direction opposite that of the ball shaft 21 that is attached to that ball 20.

Outer friction layer components 34b' and outer friction layer shaft components 36b' (e.g., a half with the concave side facing downward) may be assembled over inner friction layer 34a (and previously placed upward-facing outer friction layer components 34b' and outer friction layer shaft components 36b'). In assembling outer friction layer components 34b' over inner friction layer 34a, outer friction layer component 34b' is oriented such that outer friction layer shaft component 36b' extends in a direction opposite that of inner friction layer shaft 36a that is attached to inner friction layer 34a.

Alternatively or in addition, components of two or more double friction layers with their connecting shafts, such as, for example, two double friction layer pieces 50 (FIG. 5) may be successively assembled over inner layers (e.g., balls 20 and ball shafts 21, or another friction layer that is assembled from two double friction layer pieces 50).

Assembly of the outer envelope of the adjustable support arm may be completed (block 130).

Components (e.g., two halves) of segment outer envelope component 22' may be placed over the outer layer (e.g., outer friction layer 34b, or friction layer halves 52a or 52b of double friction layer shaft halves 54 (FIG. 4)) of two neighboring joints and the outer layer of a segment between the neighboring joints (e.g., partly including inner friction layer shaft 36a and partly including outer friction layer shaft 36b, or including double friction layer shaft halves 54). For example, socket surfaces 23 of segment outer envelope components 22' may be placed over the outer layers of two joints (e.g., outer friction layers 34b). Typically, a remaining segment outer envelope component 22' (e.g., with the concave side facing downward) may be placed over a previously placed (e.g., with concave side facing upward) segment outer envelope component 22'.

Shaft channel surface 43 of segment outer envelope component 22' may be placed over components of the connecting shaft. Segment outer envelope components 22' may be attached to one another, e.g., using screws 24 or another type of attachment.

Termination segment outer envelope components 27' may be placed over the outer layer (e.g., outer friction layer 34b, or friction layer halves 52a or 52b of double friction layer shaft halves 54) of a terminal (e.g., first or last) joint for the adjustable support arm and an outer layer (e.g., inner friction layer shaft 36a or outer friction layer shaft 36b) of a segment that extends outward (e.g., away from all of the joints) from the joint. For example, socket surface 23 of segment outer envelope 22 may be placed over the outer layer of the terminal joint (e.g., outer friction layer 34b). Shaft channel surface 43 of termination segment outer envelope component 27' may be placed over the outer layer of the components of the outward-extending segment. Typically, a remaining termination segment outer envelope component 27' (e.g., with the concave side facing downward) may be placed over a previously placed (e.g., with concave side facing upward) termination segment outer envelope component 27'. Termination segment outer envelope components 27' may be attached to one another, e.g., using screws 24 or another type of attachment.

When assembled, arm components 60 may form an adjustable support arm, such as adjustable support arm 10 (FIG. 1A). Tension preload handle 19 may be rotated to operate preload tension element 18 to apply a preload tension on cable 44. When the preload tension is applied, a locking force is applied to joints 12 of adjustable support arm 10. The locking force locks joints 12 to prevent or inhibit bending of adjustable support arm 10. Thus, adjustable support arm 10 may retain its shape when supporting an object, or when torque or lateral forces are otherwise applied. Tension release handle 16 may be operated to temporarily reduce the tension, and thus the locking force. Thus, when tension release handle 16 is operated, joints 12 may be bent, and the shape of adjustable support arm 10 may be modified. Releasing of tension release handle 16 may enable restoration of the locking force by operation of preload tension element 18 to apply a tension to tension cable 44, thus relocking joints 12.

Different embodiments are disclosed herein. Features of certain embodiments may be combined with features of other embodiments; thus certain embodiments may be combinations of features of multiple embodiments. The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. An adjustable support arm device comprising:
   a plurality of segments;
   one or a plurality of ball-and-socket joints, each joint of said one or a plurality of ball-and-socket joints connecting two adjacent segments of said plurality of segments and comprising a plurality of layers that include a ball and socket of said each joint and a plurality of friction layers that are interleaved between the ball and the socket, successive friction layers of said plurality of friction layers being attached to and rotatable with alternating segments of said two adjacent segments such that each friction layer of said plurality of friction layers is rotatable relative to adjacent layers of said plurality of layers; and
   a locking mechanism for applying a normal force to the friction layers to lock said one or a plurality of ball-and-socket joints, the mechanism being releasable to enable bending of said one or a plurality of ball-and-socket joints.

2. The device of claim 1, wherein the locking mechanism comprises a tension cable that is attached to segments on opposite sides of said each joint.

3. The device of claim 2, wherein a segment of said plurality of segments includes a channel to enable passage of the tension cable through that segment.

4. The device of claim 3, wherein the ball of a joint of said one or a plurality of ball-and-socket joints includes a hollow space to enable passage of the tension cable through that joint.

5. The device of claim 2, comprising a resilient element for applying tension to the cable.

6. The device of claim 5, wherein the resilient element comprises a stack of conical spring washers.

7. The device of claim 5, further comprising a tension release mechanism for releasing tension in the cable to release the locking mechanism, the tension release mechanism including a plunger operable to compress the resilient element, and to which an end of the cable is attached.

8. The device of claim 7, wherein the plunger is rotatable to adjust a tension in the cable.

9. The device of claim 2, comprising an element for applying a preload tension to the cable.

10. The device of claim 9, wherein the element comprises an eccentric ring, an end of the cable being attached to an axis within the eccentric ring.

11. The device of claim 9, including a mechanism to adjust a distance between connection points at opposite ends of the tension cable to adjust the preload tension.

12. The device of claim 1, wherein the ball or a friction layer of said plurality of friction layers is attached to a shaft that extends into one of the two adjacent segments.

13. The device of claim 12, wherein the shaft has a non-circular cross section.

14. The device of claim 12, wherein the shaft has a polygonal cross section.

15. The device of claim 14, wherein the cross section is hexagonal.

16. The device of claim 12, wherein two friction layers of two neighboring joints of said one or a plurality of joints are commonly attached to the shaft.

17. The device of claim 1, wherein a shape of a friction layer of said plurality of friction layers is configured to adapt to a shape of an adjacent layer when the normal force is applied.

18. The device of claim 17, wherein said friction layer of said plurality of friction layers includes a slot.

19. The device of claim 1, wherein each friction layer of said plurality of friction layers comprises at least two components that are assembled to form that friction layer.

20. The device of claim 1, wherein the socket of a joint of said one or a plurality of ball-and-socket joints is incorporated within an outer envelope that is assembled over the friction layers.

\* \* \* \* \*